(12) United States Patent
Roach et al.

(10) Patent No.: US 10,971,128 B2
(45) Date of Patent: Apr. 6, 2021

(54) ACOUSTIC LINER AND METHODS OF CONSTRUCTING AN ACOUSTIC LINER

(71) Applicant: MRA Systems, LLC, Baltimore, MD (US)

(72) Inventors: Andrew Michael Roach, Baltimore, MD (US); Graham Frank Howarth, Baltimore, MD (US); Steven Thomas Davies, Baltimore, MD (US); Richard David Cedar, Cincinnati, OH (US); Michael Moses Martinez, Cincinnati, OH (US); Timothy Richard Depuy, Cincinnati, OH (US)

(73) Assignee: MRA SYSTEMS, LLC, Wilmington, DE (US)

( * ) Notice: Subject to any disclaimer, the term of this patent is extended or adjusted under 35 U.S.C. 154(b) by 262 days.

(21) Appl. No.: 15/559,180

(22) PCT Filed: Apr. 10, 2015

(86) PCT No.: PCT/US2015/025403
§ 371 (c)(1),
(2) Date: Sep. 18, 2017

(87) PCT Pub. No.: WO2016/164043
PCT Pub. Date: Oct. 13, 2016

(65) Prior Publication Data
US 2018/0082671 A1    Mar. 22, 2018

(51) Int. Cl.
*G10K 11/172* (2006.01)
*G10K 11/168* (2006.01)
*B24C 1/04* (2006.01)

(52) U.S. Cl.
CPC .......... *G10K 11/172* (2013.01); *G10K 11/168* (2013.01); *B24C 1/04* (2013.01); *B24C 1/045* (2013.01)

(58) Field of Classification Search
CPC ..... G10K 11/172; G10K 11/168; F02C 7/045; F02C 7/24
(Continued)

(56) References Cited

U.S. PATENT DOCUMENTS 4,612,737 A    9/1986  Adee et al.
4,743,740 A    5/1988  Adee
(Continued)

FOREIGN PATENT DOCUMENTS

CN    2658898 Y    11/2004
CN    2694425 Y    4/2005
(Continued)

OTHER PUBLICATIONS

English translation of CN 2694425 Y, accessed Aug. 4, 20 from Espacenet.*
(Continued)

*Primary Examiner* — Jeremy A Luks
(74) *Attorney, Agent, or Firm* — Xsensus LLP

(57) ABSTRACT

An acoustic liner (20) with perforation (30) and method of constructing (100) an acoustic liner including forming perforations in the facing sheet by grit blasting (104) the facing sheet and mounting (106) the facing sheet to one side of a support layer having a set of partitioned cavities wherein the facing sheet closes an open face of the cavities except for the perforations to form a set of acoustic resonator cells.

18 Claims, 5 Drawing Sheets

(58) Field of Classification Search
USPC .................................................. 181/290, 292
See application file for complete search history.

(56) References Cited

U.S. PATENT DOCUMENTS

| | | | |
|---|---|---|---|
| 6,609,592 B2 | 8/2003 | Wilson | |
| 6,739,830 B2* | 5/2004 | Sathianathan | ........ F01D 21/045 |
| | | | 415/173.4 |
| 8,294,059 B2* | 10/2012 | Calder | ............... B23K 15/0006 |
| | | | 181/292 |
| 2013/0341119 A1 | 12/2013 | Ichihashi | |
| 2014/0248116 A1 | 9/2014 | Ali | |

FOREIGN PATENT DOCUMENTS

| | | |
|---|---|---|
| CN | 101652809 A | 2/2010 |
| CN | 103038484 A | 4/2013 |
| EP | 509166 A1 | 10/1992 |
| JP | 62191890 A | 8/1987 |
| JP | H11194780 A | 7/1999 |
| JP | 2005031240 A | 2/2005 |
| JP | 6284526 B2 | 2/2018 |
| JP | 6407866 B2 | 10/2018 |
| WO | 2004016872 A1 | 2/2004 |
| WO | 2014042857 A2 | 3/2014 |

OTHER PUBLICATIONS

Japanese Office Action With English Summary for Counterpart JP2017-550716, dated Mar. 19, 2019.
International Search Report and Written Opinion issued in connection with corresponding PCT application PCT/US2015/025403 dated Apr. 10, 2015.
Japanese Patent Office, Office Action re Japanese Patent Application No. 2017-550716, dated Nov. 12, 2019, 3 pages, Japan.
Chinese Office Action dated Mar. 26, 2020 in Chinese Application No. 201560078705.8.
Japanese Notice of Reasons for Rejection dated Nov. 12, 2019 in Japanese Application No. 2017-550716.
Japanese Decision of Rejection and Decision to Reject the Amendments dated May 11, 2020 in Japanese Application No. 2017-550716.
European Communication Pursuant to Article 94(3) dated Mar. 31, 2020 in European Application No. 15719352.5.
Chinese Office Action dated Dec. 3, 2020 in Chinese Application No. 201580078705.8.

* cited by examiner

ACOUSTIC LINER AND METHODS OF CONSTRUCTING AN ACOUSTIC LINER

BACKGROUND OF THE INVENTION

Contemporary aircraft engines can include acoustic attenuation panels in aircraft engine nacelles to reduce noise emissions from aircraft engines. These acoustic attenuation panels generally have a sandwich structure that includes sheets enclosing a cellular honeycomb-type inner structure.

BRIEF DESCRIPTION OF THE INVENTION

In one aspect, an embodiment of the invention relates to an acoustic liner having a support layer that includes a set of partitioned cavities with open faces, a facing sheet operably coupled to the support layer such that the facing sheet overlies and closes the open faces and a set of perforations included in the facing sheet, and in fluid communication with cavities included in the set of cavities to form a set of acoustic resonators and where the set of perforations are formed via grit blasting and range in diameter from 0.026 inches to 0.0299 inches.

In another aspect, an embodiment of the invention relates to a method of constructing an acoustic liner including applying a mask with openings onto the facing sheet, forming perforations, ranging in diameter from 0.026 inches to 0.0299 inches, in the facing sheet by grit blasting the facing sheet and the mask applied to the facing sheet such that the mask blocks the grit and the openings in the mask permit the grit to contact the facing sheet and form the perforations and mounting the facing sheet to a first side of the support layer having a set of partitioned cavities and where the facing sheet closes an open face of the cavities except for the perforations to form a set of acoustic resonator cells.

DESCRIPTION OF EMBODIMENTS OF THE INVENTION

Contemporary aircraft engine and nacelle structures typically include acoustic attenuation panels having a perforated, acoustic facing skin. Conventional acoustic perforated skins typically included multiple, individual perforations of greater than 0.040 inches (1.0 mm) in diameter in order to achieve acceptable acoustic characteristics. To achieve an acoustic attenuation capability over wider frequency bands these perforated skins, often with larger perforation diameters than 0.04 inches, have been combined with surface or sub-surface treatments of woven fabric or mesh to create what is known as a linear liner. In order to achieve similar acoustic capabilities as a linear liner, the industry has also developed and proposed micro perforated skins with many small perforations typically of approximately 0.005 inches in diameter to 0.008 inches in diameter but without the use of fabric or mesh. This technology has not been generally implemented in significant volume, at least in part, because the micro perforations must be created utilizing complex and expensive laser perforation techniques.

Embodiments of the invention described herein include the use of perforations in the acoustic skin. Such perforations include a perforation size range that is above the perforation size of micro perforated skins and below the perforation size of conventional acoustic skins. Such a range of perforations results in improved skin friction and structural performance versus conventional perforations and has more feasible manufacturability and acceptable acoustic performance without the complexity and cost of manufacturing associated with micro perforated skins or linear liner acoustic panels.

Figure 1:
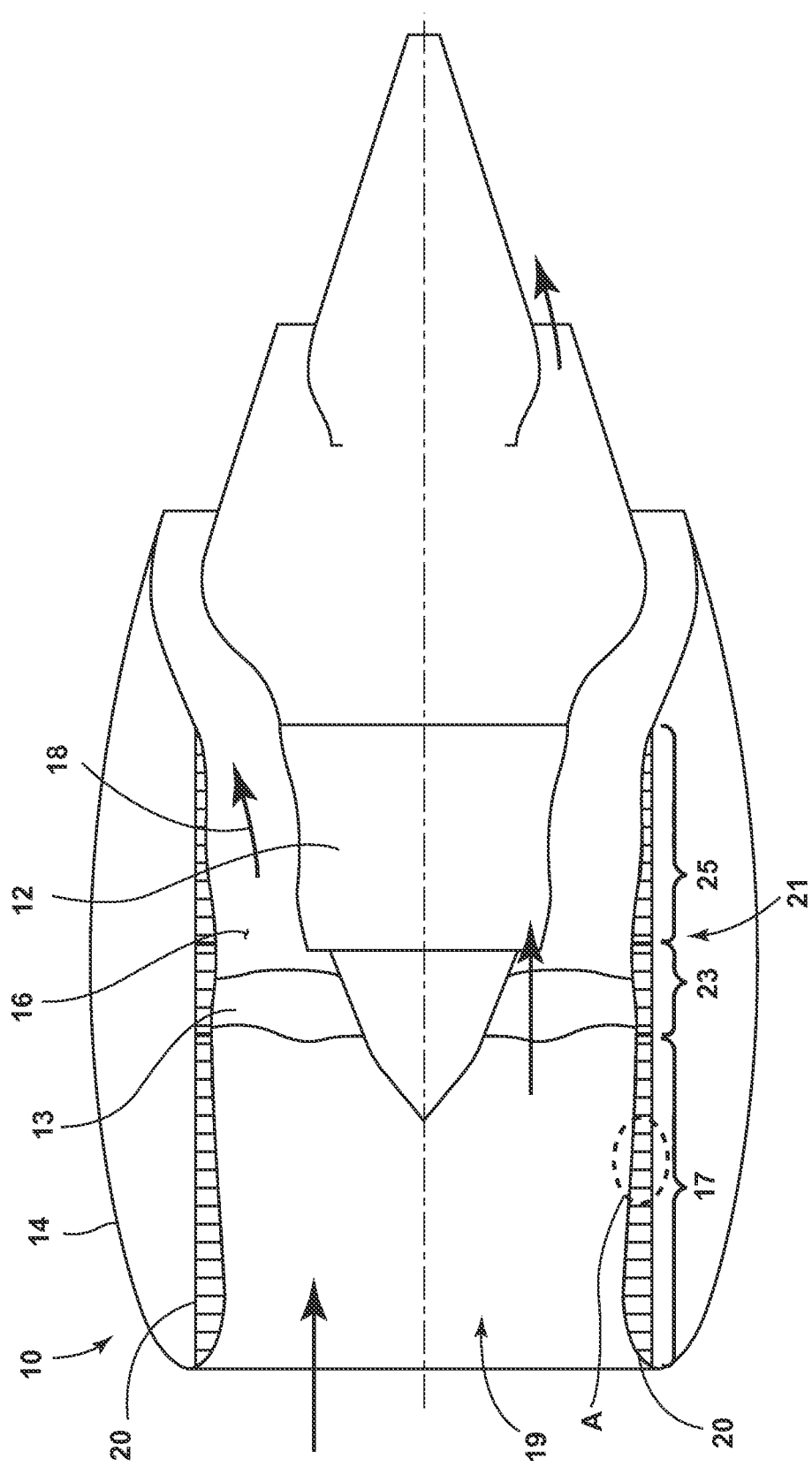
FIG. 1 is a schematic view of an aircraft engine assembly with a portion of the outer nacelle cut away for clarity.

FIG. 1 illustrates an environment that can utilize embodiments of the invention including an aircraft engine assembly 10 having a turbine engine 12, a fan assembly 13, and a nacelle 14. Portions of the nacelle 14 have been cut away for clarity. The nacelle 14 surrounds the turbine engine 12 and has an inlet section 17 that defines an inlet 19 open to ambient air and an annular airflow path or annular bypass duct 16 through the aircraft engine assembly 10 to define a generally forward-to-aft bypass airflow path as schematically illustrated by the arrow 18. The turbine engine 12 can have a fan section 21 that includes an annular fan case 23 and an aft duct 25 of a thrust reverser (not shown). The fan section can be provided within the nacelle wherein the fan section 21 is in fluid communication with the inlet 19. An annular acoustic panel or acoustic liner 20 is provided within the nacelle in at least a portion of the inlet 19 or the fan section 21. The acoustic liner 20 attenuates noise in the aircraft engine assembly 10 and defines the through air flow.

Figure 2:
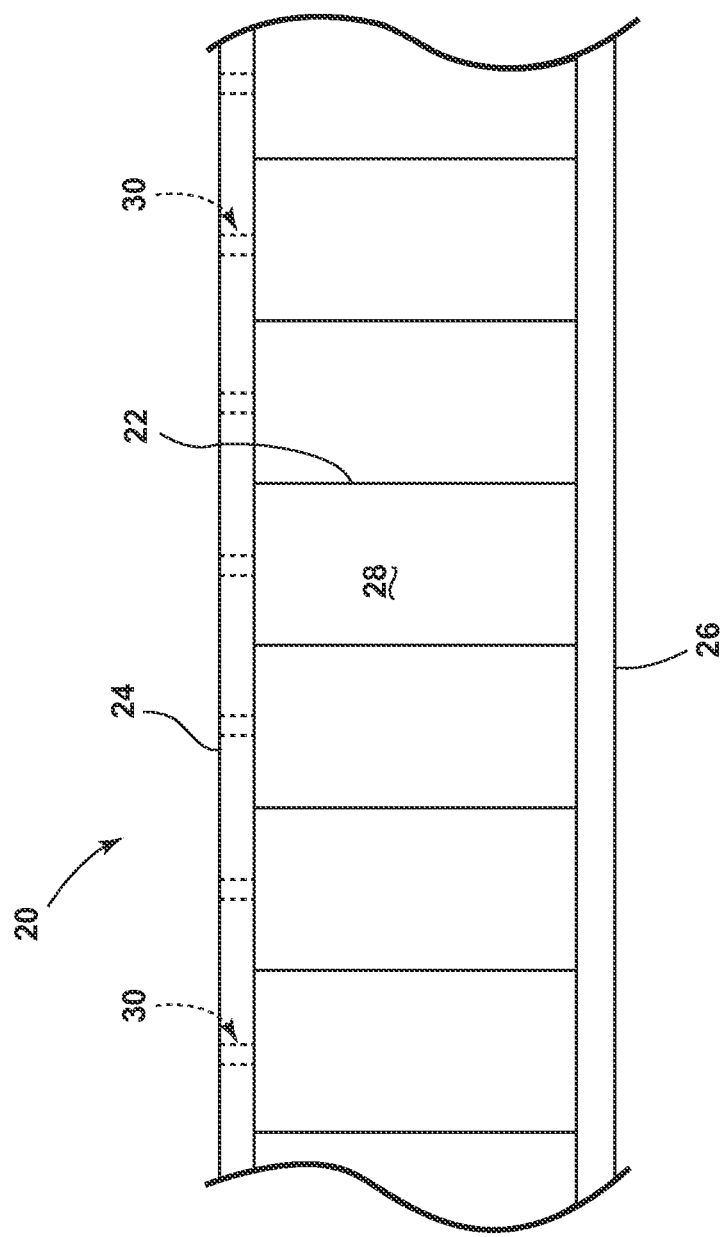
FIG. 2 is a side view of section A of the acoustic panel of FIG. 1.

FIG. 2 shows a side view of the annular acoustic panel of FIG. 1, which can incorporate the perforations according to embodiments of the invention. The annular acoustic liner 20 includes an open framework 22 disposed between an imperforate backing sheet 26 and a perforated sheet or facing sheet 24. The open framework 22 forms a support layer having a set of partitioned cavities or cells 28 with open faces. Including that the open framework 22 has open faces on opposing front and rear sides of the open framework 22. In this manner, the open framework 22 forms a set of cells 28 in the open spaces between the open framework 22, the backing sheet 26 and the facing sheet 24.

Figure 3:
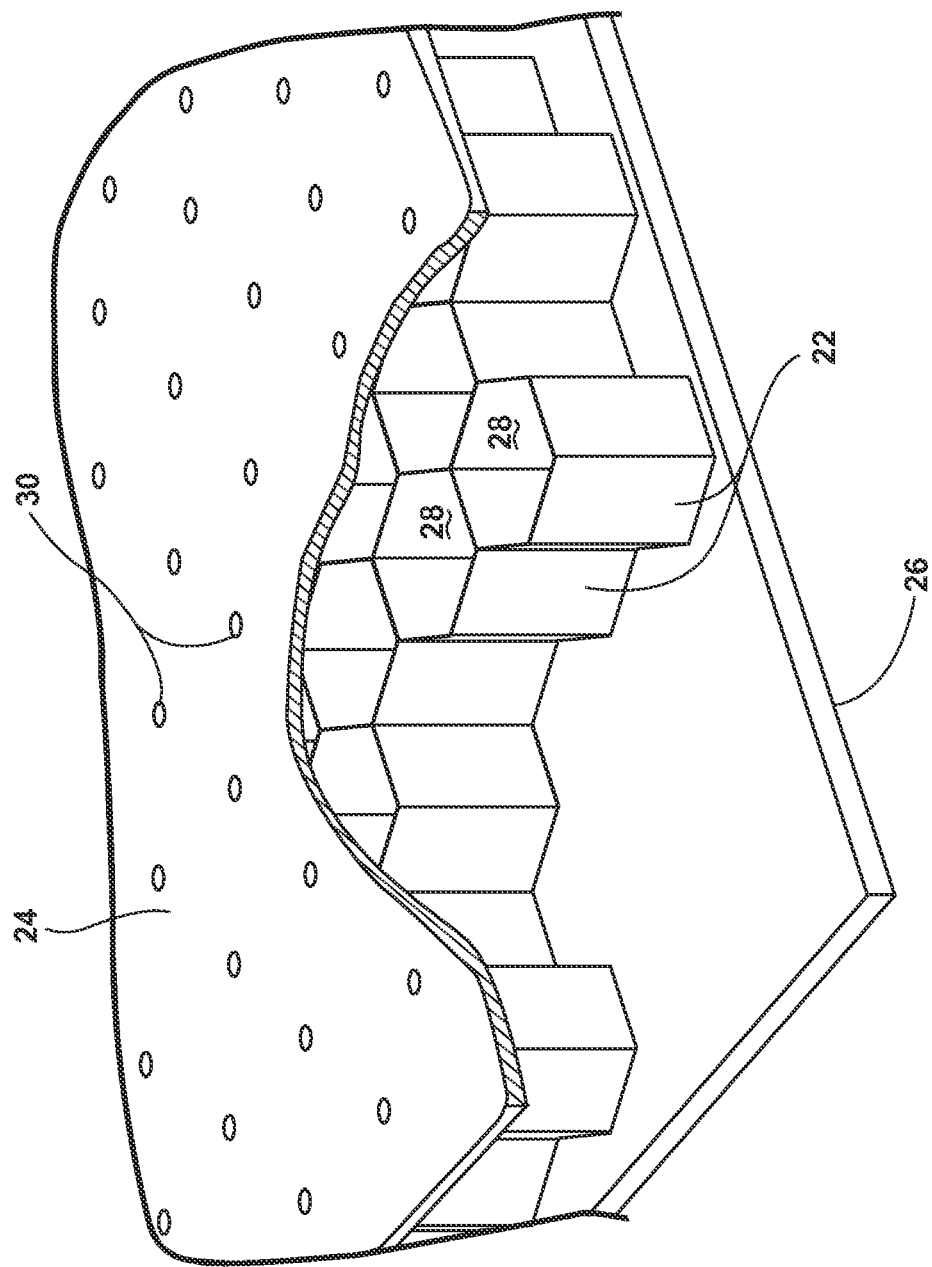
FIG. 3 is perspective view of the acoustic panel of FIG. 1 with portions removed for clarity.

As illustrated more clearly in FIG. 3, the cells 28 formed by the open framework 22 disposed between the backing sheet 26 and the facing sheet 24 each have a predetermined volume defined by the geometry of the open framework 22 and the spacing between the backing sheet 26 and the facing sheet 24. The open framework 22 can include a honeycomb structure wherein the cells have six walls formed by the open frame work 22, a bottom wall formed by the backing sheet 26 and a top wall formed by the facing sheet 24. The backing sheet 26 can be impervious with respect to air. More specifically, the backing sheet can be an imperforate sheet supported by the support layer or open framework 22 on an opposite side of the open framework 22 than the facing sheet 24. In this manner, the imperforate sheet is on a back side of the open framework 22 and closes off the open faces on the back side.

The facing sheet 24 can be perforated such that a set of perforations 30, which form inlets, in a predetermined pattern are formed in the facing sheet 24 to allow air into selected cells 28. The facing sheet 24 can be supported by the open framework 22 such that perforations 30 are in overlying relationship with the open faces of the open framework 22 to form paired perforations 38 and cavities that define the acoustic resonator cells 28. The perforated sheet can be directly supported on the open framework 22. Alternatively, an intervening layer can be utilized. The facing sheet 24 can be formed from any suitable material including, but not limited to, a composite material. The perforations can be identical in area or can vary in area in different zones of the perforated sheet. The backing sheet 26 and facing sheet 24 and open framework 22 can be formed such that there are no seams present in backing sheet 26 and facing sheet 24 and open framework 22.

Cells 28 can form a portion of an acoustic resonator. For instance, the area of the perforation 30 and thickness of the facing sheet 24 can define neck portions of the Helmholtz resonators, and the volume of the cells 28 can define the cavity volume. For example, the resonators can be tuned to attenuate predetermined frequencies associated with engine sounds entering the acoustic resonators. Tuning can be done by multiple processes well understood by those practiced in the art of acoustic design. The honeycomb cells 28 can be a single layer of hexagonal geometry or multiple layers of the same or different geometry separated by a porous layer, typically identified as a septum. In addition, alternate geometries other than hexagonal can be envisaged including random size cells formed by open cell foams or similar materials.

Figure 4:
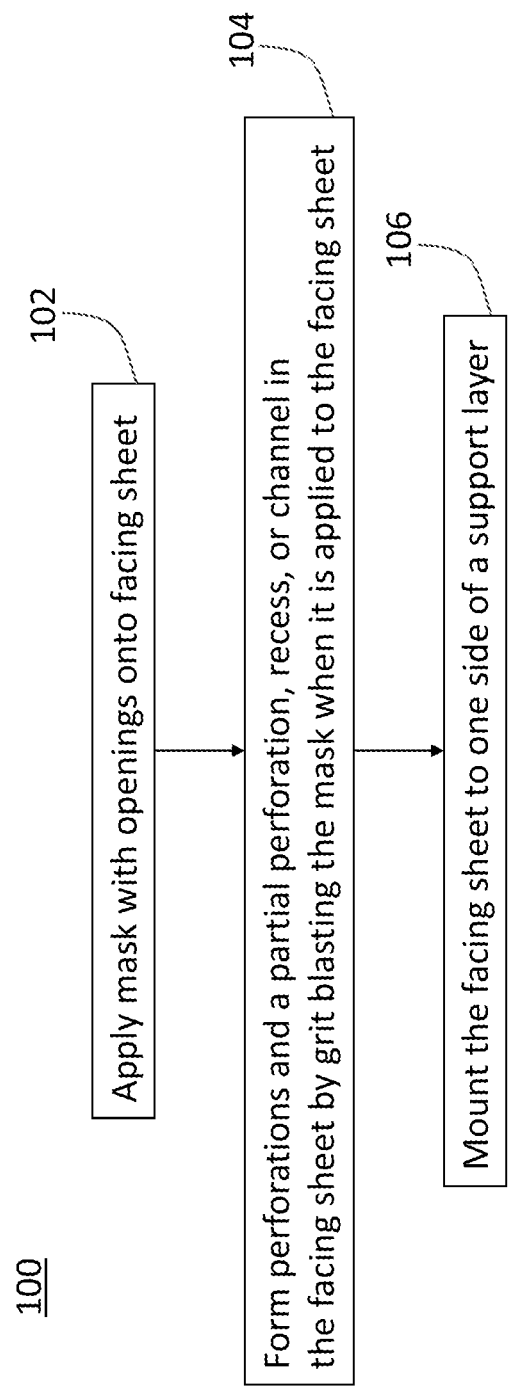
FIG. 4 is a flow chart showing a method of forming perforations, such as those in FIG. 2, according to an embodiment of the invention.

In accordance with an embodiment of the invention, FIG. 4 illustrates a method 100, which can be used for forming perforations in the facing sheet 24 of the acoustic liner 20. The method 100 begins at 102 with applying a mask with openings onto the facing sheet 24. The openings in the mask are sized such that perforations can be formed in the facing sheet 24. The mask can be applied to the facing sheet 24 so that only selected areas of the facing sheet 24 (i.e. the areas accessible via the openings) are grit blasted. In this manner, the mask protects non-target areas from the abrasive grit spray. The mask can be self-adhesive or include an adhesive, which allows it to be attached to the facing sheet 24 or the mask can be attached to the facing sheet using any suitable means. The type of masking material can be chosen based on the type of grit used, the grit size used, the duration of the blasting process, the pressure utilized to spray the grit, etc. The mask should be of sufficient wear resistance to shield the substrate around the periphery of the perforation.

The method can include forming perforations ranging in diameter from 0.026 inches to 0.0299 inches in the facing sheet 24 by grit blasting. The mask and the portions of the facing sheet 24 accessible via the openings in the mask are both grit blasted as indicated at 104. Grit blasting, also known as abrasive blasting, can include forcibly propelling a stream of grit or abrasive material against a surface under high pressure to shape the surface, including openings in the surface. The grit blasting can include using grit having a size with dimensions smaller than that of the desired perforation, and can include moving the grit at a speed necessary to provide sufficient kinetic energy to disrupt the facing sheet 24. The openings in the mask permit the grit to contact the facing sheet 24 while the remainder of the mask blocks the grit. In this manner, the perforations, at the openings in the mask, can be formed via the grit blasting. The mask can be removed from the facing sheet 24 after the grit blasting at 204 is finished.

In the instance where the facing sheet 24 includes a composite sheet, the grit blasting will include grit blasting the composite sheet accessible via the openings in the mask. It will be understood that the composite sheet of the facing sheet 24 can be any suitable composite including, but not limited to, a composite having a resin and fiber construction. The use of perforations ranging in diameter from 0.026 inches to 0.0299 inches results in the removal of less material from such a fiber reinforced composite sheet and will therefore break less fibers resulting in improved skin structural capability with potential for weight savings by reducing skin thickness. More specifically, the density of fibers or number of composite material plies within the resin forming the composite facing sheet 24 can be less than what would otherwise be required for the same structural loading requirements had another forming method or size been used for the perforations. Further, the thickness of the composite sheet can be less than what would otherwise be required for the same structural loading requirements had another forming method or size been used for the perforations.

At 106, the facing sheet 24 can be mounted to one side of the support layer or open framework 22 having the set of partitioned cavities. In this manner, the facing sheet 24 closes an open face of the cavities, except for the perforations, to form a set of acoustic resonator cells 28.

It will be understood that the method 100 of forming perforations in the facing sheet of the acoustic liner is flexible and the method 100 illustrated is merely for illustrative purposes. For example, the sequence of steps depicted is for illustrative purposes only, and is not meant to limit the method 100 in any way, as it is understood that the steps can proceed in a different logical order or additional or intervening steps can be included without detracting from embodiments of the invention. By way of non-limiting example, it will be understood that the facing sheet 24 can be grit blasted prior to the mounting the facing sheet 24 to the open framework 22 or that the facing sheet 24 can be grit blasted after the mounting the facing sheet 24 to the open framework 22. Further, an imperforate backing sheet 26 can be mounted to a side of the open framework 22 opposite where the facing sheet 24 is to be mounted or has been mounted.

Figure 5:
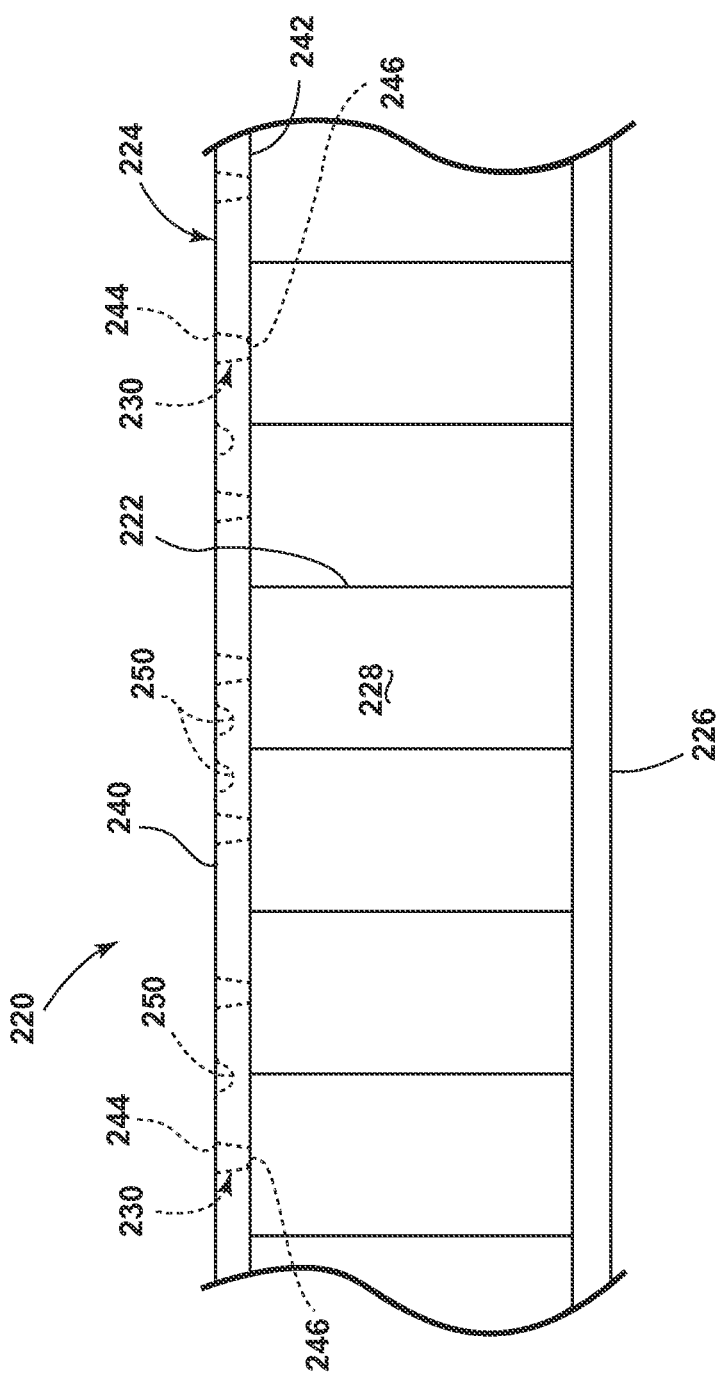
FIG. 5 is a side view of an acoustic panel that can also be formed by the method of FIG. 4.

The method 100 can be utilized to form any suitable perforations and surface features including those illustrated in FIG. 5. FIG. 5 illustrates an acoustic liner 20 according to another embodiment of the invention. The acoustic liner 220 is similar to the acoustic liner 20. Therefore, like parts will be identified with like numerals increased by 200, with it being understood that the description of the like parts of the acoustic liner 20 applies to the acoustic liner 220, unless otherwise noted.

One difference is that the perforations 230 of the acoustic liner 220 include an entry diameter 244 that is different in size than the exit diameter 246. More specifically, the entry diameter 244 resulting from the grit blasting on the masked side 240 of the facing sheet 224, can be marginally larger than the exit diameter 246, on the unmasked side 242 of the facing sheet 224, or vice-versa. The perforations 230 having such a larger entry diameter can create a nozzle effect that can be utilized to optimize acoustic attenuation while reducing skin friction.

Further still, the method 100 can be utilized to achieve surface characteristics in the facing sheet 224. For example, discontinuities 250 can be achieved by using multiple layer masks and grit blasting such masks. The discontinuities 250 can include, but are not limited to, partial perforations or channels. Such additional surface characteristics can also reduce skin friction and aerodynamic drag. It is contemplated that any number of such discontinuities 250 can be located between the perforations 230 to enhance the continuation of laminar flow and reduce skin friction resulting from circumferential flow of vortices from the perforations.

The use of linear liners has documented increased complexity, cost of manufacture, in service maintenance issues, and increased weight. Potentially improved aerodynamic and acoustic results from proposed micro perforated skins are only achieved by the use of highly developed and controlled laser systems that have many logistics issues and have yet to be successfully demonstrated and implemented on the large, complex geometry acoustic panels found in engine nacelles. The above-described embodiments do not use linear liners and do not use micro perforations.

The embodiments described above provide for a variety of benefits including that the aircraft engine assembly including the perforations can provide at least equivalent acoustic performance and potentially reduced weight with improved manufacturability and reduced complexity and cost versus linear liners and micro perforated skins. The above-described embodiments achieve lower skin friction, resulting in reduced drag, by using smaller perforations than current conventional acoustic treatments. Further, the perforations in the above-described embodiments can be cost effectively manufactured by a grit blasting manufacturing technique. Another benefit is that the grit blasting process yields smoother more consistent perforations.

To the extent not already described, the different features and structures of the various embodiments may be used in combination with each other as desired. That one feature may not be illustrated in all of the embodiments and is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An acoustic liner, comprising:
   a support layer that includes a set of partitioned cavities with open faces;
   a facing sheet operably coupled to the support layer such that the facing sheet overlies and closes the open faces, a surface of the facing sheet includes at least one of a partial perforation, a recess, and a channel, each of which extends less than all the way through the facing sheet; and
   a set of perforations included in the facing sheet, and in fluid communication with cavities included in the set of cavities to form a set of acoustic resonators and where the set of perforations are formed via grit blasting and range in diameter from 0.026 inches to 0.0299 inches, each of the set of perforations being arranged on the facing sheet separately from the at least one partial perforation, recess, and channel.

2. The acoustic liner of claim 1, further comprising an imperforate backing sheet supported on a side of the support layer opposite the facing sheet.

3. The acoustic liner of claim 1 wherein the facing sheet is a composite facing sheet.

4. The acoustic liner of claim 1 wherein at least one perforation includes an inlet and an outlet where the inlet has a larger diameter than the diameter of the outlet.

5. A method of constructing an acoustic liner, the method comprising:
   applying a mask with openings onto a facing sheet;
   forming perforations, ranging in diameter from 0.026 inches to 0.0299 inches, and at least one of a partial perforation, a recess, and a channel, each of which extends less than all the way through the facing sheet, in a surface of the facing sheet by grit blasting the facing sheet and the mask applied to the facing sheet such that the mask blocks the grit and the openings in the mask permit the grit to contact the facing sheet and form the perforations and the at least one of the partial perforation, the recess, and the channel, each of the perforations being arranged on the facing sheet separately from the at least one partial perforation, recess, and channel; and
   mounting the facing sheet to a first side of a support layer having a set of partitioned cavities and where the facing sheet closes an open face of the cavities except for the perforations to form a set of acoustic resonator cells.

6. The method of claim 5 wherein the facing sheet is grit blasted prior to mounting the facing sheet to the one side of the support layer.

7. The method of claim 5 wherein the facing sheet is grit blasted after mounting the facing sheet to the one side of the support layer.

8. The method of claim 5 wherein the grit blasting the facing sheet includes grit blasting a composite sheet.

9. The method of claim 8 wherein the composite sheet includes a resin and fiber construction.

10. The method of claim 5, further comprising applying a mask with openings onto the facing sheet, with the mask blocking the grit and the openings permitting the grit to contact the facing sheet and form the perforations at the openings.

11. The method of claim 5 wherein the mask is applied to a front side of the facing sheet.

12. The method of claim 1 wherein the grit blasting forms a perforation having an inlet and an outlet and the diameter of the inlet is larger than the diameter of the outlet.

13. The method of claim 1 wherein applying the mask comprises applying a mask having multiple layers.

14. The acoustic liner of claim 1, wherein at least one cavity in the set of cavities is in fluid communication with only one perforation in the set of perforations to form an acoustic resonator in the set of acoustic resonators.

15. The acoustic liner of claim 1, wherein
    each of the perforations in the set of perforations extends all the way through the facing sheet.

16. The acoustic liner of claim 1, wherein the facing sheet is provided within a nacelle of an aircraft engine, without an intervening linear liner between the facing sheet and a turbine of the aircraft engine.

17. The acoustic liner of claim 1, wherein the facing sheet is coupled to the support layer on a side of the support layer that is closest to a turbine of an aircraft engine.

18. The acoustic liner of claim 1, wherein the surface of the facing sheet is a side of the facing sheet closest to a turbine of an aircraft engine.

\* \* \* \* \*